United States Patent [19]

Usubuchi et al.

[11] 4,215,375
[45] Jul. 29, 1980

[54] DIGITAL FACSIMILE TRANSMISSION SYSTEM FOR SCREENED PICTURES

[75] Inventors: Touru Usubuchi; Kazumoto Iinuma, both of Tokyo, Japan

[73] Assignee: Nippon Electric Company, Ltd., Tokyo, Japan

[21] Appl. No.: 14,508

[22] Filed: Feb. 23, 1979

[30] Foreign Application Priority Data

Feb. 23, 1978 [JP] Japan .................................. 53-20457
Sep. 19, 1978 [JP] Japan .................................. 53-115357
Oct. 17, 1978 [JP] Japan .................................. 53-127485

[51] Int. Cl.$^2$ ............................................. H04N 1/00
[52] U.S. Cl. .................................... 358/261; 364/515; 340/347 DD; 375/28
[58] Field of Search ............... 358/260, 261, 133, 135, 358/136, 138; 325/38 B; 364/515; 340/347 DD

[56] References Cited

U.S. PATENT DOCUMENTS

| 4,060,834 | 11/1977 | Mounts et al. .......................... 358/261 |
| 4,133,006 | 1/1979 | Iinuma ................................. 358/136 |
| 4,141,034 | 2/1979 | Netrvali et al. ........................ 358/135 |
| 4,144,543 | 3/1979 | Koga .................................. 358/136 |
| 4,144,547 | 3/1979 | Stoffel ................................ 358/260 |

OTHER PUBLICATIONS

Thomas S. Huang, "Coding of Two-Tone Images", I.E.E.E. Trans. on Comm., vol. COM-25, No. 11 (Nov.-77), pp. 1406–1425.
H. Wyle et al., "Reduced-Time Facsimile Transmission by Digital Coding", IRE Trans. on Comm. Systems, vol. CS-9, No. 3, 9-61, pp. 215–222.
D. Preub, "Two-Dimensional Facsimile Source Encoding Based on a Markov Model", Nachrichten Techische Zeitschrift, vol. 10, 1975, pp. 358–363.
H. Kobayashi et al., "Image Data Compression by Predictive Coding I: Prediction Algorithms", I.B.M., J. Res. Develop., 3–74.

Primary Examiner—Robert L. Griffin
Assistant Examiner—Edward L. Coles
Attorney, Agent, or Firm—Sughrue, Rothwell, Mion, Zinn and Macpeak

[57] ABSTRACT

A digital facsimile system suitable for the facsimile transmission of newspaper pages having screened picture portions and printed character portions is disclosed. The transmitter receives a digitized facsimile signal which is a train of pel codes formed by scanning a picture to be transmitted. In response to the digitized facsimile signal, a first reference generator produces first pel codes neighboring the present pel code, a second pel code spaced by the pitch of the screened picture from the present pel code, and third pel codes neighboring the second pel code. A ROM is addressed by the first, second and third pel codes to produce a first prediction code for the present pel code. The output of the ROM and the digitized facsimile signal are supplied to an Exclusive OR which provides a prediction error code according to the difference between the first prediction code and the present pel code. A train of prediction errors codes constitutes a prediction error signal which is encoded and transmitted. The receiver receives the encoded prediction error signal and decodes it to reproduce the prediction error signal. Another Exclusive OR produces the present pel code from each error code of the prediction error signal. A second reference code generator produces a second reference code corresponding to the first reference code on the basis of the output of the second Exclusive OR. A second ROM produces a second prediction code corresponding to the first prediction code on the basis of the second reference code and applies the second prediction code to the second Exclusive OR.

6 Claims, 16 Drawing Figures

| $a_1$ | $a_3$ | $a_4$ | $b_2$ | $b_5$ | P | $a_1$ | $a_3$ | $a_4$ | $b_2$ | $b_5$ | P |
|---|---|---|---|---|---|---|---|---|---|---|---|
| 0 | 0 | 0 | 0 | 0 | 0 | 1 | 0 | 0 | 0 | 0 | 0 |
| 0 | 0 | 0 | 0 | 1 | 0 | 1 | 0 | 0 | 0 | 1 | 0 |
| 0 | 0 | 0 | 1 | 0 | 0 | 1 | 0 | 0 | 1 | 0 | 0 |
| 0 | 0 | 0 | 1 | 1 | 0 | 1 | 0 | 0 | 1 | 1 | 0 |
| 0 | 0 | 1 | 0 | 0 | 0 | 1 | 0 | 1 | 0 | 0 | 1 |
| 0 | 0 | 1 | 0 | 1 | 0 | 1 | 0 | 1 | 0 | 1 | 0 |
| 0 | 0 | 1 | 1 | 0 | 1 | 1 | 0 | 1 | 1 | 0 | 1 |
| 0 | 0 | 1 | 1 | 1 | 0 | 1 | 0 | 1 | 1 | 1 | 1 |
| 0 | 1 | 0 | 0 | 0 | 0 | 1 | 1 | 0 | 0 | 0 | 1 |
| 0 | 1 | 0 | 0 | 1 | 0 | 1 | 1 | 0 | 0 | 1 | 0 |
| 0 | 1 | 0 | 1 | 0 | 1 | 1 | 1 | 0 | 1 | 0 | 1 |
| 0 | 1 | 0 | 1 | 1 | 1 | 1 | 1 | 0 | 1 | 1 | 1 |
| 0 | 1 | 1 | 0 | 0 | 1 | 1 | 1 | 1 | 0 | 0 | 0 |
| 0 | 1 | 1 | 0 | 1 | 1 | 1 | 1 | 1 | 0 | 1 | 0 |
| 0 | 1 | 1 | 1 | 0 | 1 | 1 | 1 | 1 | 1 | 0 | 1 |
| 0 | 1 | 1 | 1 | 1 | 1 | 1 | 1 | 1 | 1 | 1 | 1 |

FIG 4

FACSIMILE PICTURES (a)

PREDICTION ERROR SIGNAL (b)

PREDICTION ERROR SIGNAL (c)

DIGITAL FACSIMILE TRANSMISSION SYSTEM FOR SCREENED PICTURES

DESCRIPTION OF THE PRIOR ART

Facsimile information and coders with frequency band compression, which encode the above-mentioned newspaper pages, are described in U.S. Pat. No. 4,144,547, issued to James C. Stoffel et al on Mar. 13, 1979 (reference 2) and in U.S. Pat. No. 4,060,834 issued to Frank William Mounts et al on Nov. 29, 1977 (reference 3). Neither reference 3 nor reference 4 give any detailed structure of the entire transmission system including the transmitter and receiver.

BACKGROUND OF THE INVENTION

The invention relates to a digital facsimile transmission system for effectively transmitting newspaper pages and the like, which include screened pictures.

In a conventional facsimile system, a picture to be transmitted consisting of a number of picture elements (pels) is optically scanned to produce a two-level (black and white) picture signal representing a chain of lines each composed of a plurality of pels and to convert the picture signal into a corresponding digital signal, which is composed of a train of binary codes corresponding to the pels. More specifically, within a facsimile transmitter, a coder encodes a voltage proportional in amplitude to the level of brightness of a pel. The encoded voltage is then transmitted to a receiver, where it is decoded to reproduce the original picture.

One coding system to reduce the number of bits to be transmitted is described in an article entitled "Image Data Compression by Predictive Coding I: Prediction Algorithms" by H. Kobayashi and L. R. Bahl, published in *IBM Journal of Research and Development*, Vol. 18, No. 2, March issue, 1974, pp. 164–171 (Reference 1). In this system, the prediction of a pel code is made on the basis of binary codes representative of neighboring pels including the preceding line. In more particular, the difference between the predicted pel code and the present pel code is taken as a prediction error code (error code), which is then coded for transmission to a receiver. For this reason, the system is suitable for coding of documents such as those including letters and photographs for offset printing, because they have a strong correlation between adjacent pels on a scanning line. However, the system cannot achieve the above-mentioned reduction of the bit number to be transmitted when applied to the coding of newspaper pages including printed character portions and screened picture portions, the latter having a strong correlation between adjacent screens rather than adjacent pels.

A digital facsimile transmission of newspaper pages is discussed in a paper titled "Coding of Two-Tone Images" by Thomas S. Huang published in IEEE Transactions on Communications, Vol. COM-25, No. 11 (November issue, 1977), pp. 1406–1424 (Reference 4). However, the Huang paper does not give any structural details therefor.

SUMMARY OF THE INVENTION

An object of the present invention is, therefore, to provide a digital facsimile system with a novel hardware structure suitable for the facsimile transmission of newspaper pages and the like having screened picture portions and printed character portions.

According to the present invention, there is provided a digital facsimile transmission system for newspaper pages and the like having at the transmitting end, an input terminal for receiving a digitized facsimile signal which is a train of pel codes formed by scanning a picture to be transmitted, a first reference (REF) code generator including first means for providing from the present pel code first pel codes neighboring the present pel code, second means for providing a second pel code spaced by the pitch of the screened picture on the basis of the present pel code, and third means for providing third pel codes neighboring the second pel code. The first REF code generator produces a first REF code including the first to third pel codes. Also at the transmitting and, there is provided means for producing a first prediction code for the present pel code on the basis of the first REF code, means for providing a prediction error code associated with the difference between the first prediction code and the present pel code, a train of said prediction error codes constituting a prediction error signal, and means for encoding said prediction error signal. Further, the transmission system has, at the receiving end, a decoder for decoding the encoded signal transmitted from said transmitting end to reproduce said prediction error signal, means for producing the present pel code from each error code of said prediction error signal; means for producing a second REF code corresponding to the first REF code on the basis of the output of said present pel code generating means, and means for producing a second prediction code corresponding to the first prediction code on the basis of the second REF code and for applying the second prediction code to said present pel code generating means.

BRIEF DESCRIPTION OF THE DRAWINGS

Other objects and features of the present invention will be apparent from the following description when taken in conjunction with the accompanying drawings, in which.

DESCRIPTION OF THE PREFERRED EMBODIMENTS

Throughout the drawings, thick lines with arrows are signal paths for time parallel digital signals and thin lines with arrows are those for time-serial ones.

Figure 1:
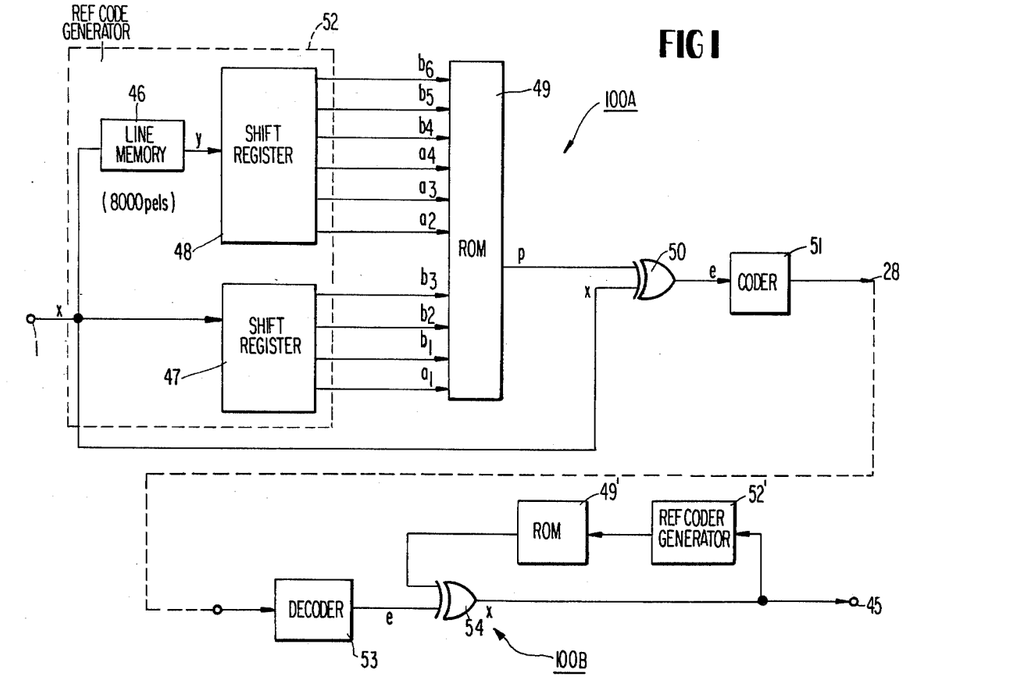
FIG. 1 is a block diagram of a first embodiment of this invention.

Referring to FIG. 1, the present system comprises a transmitter 100A and a receiver 100B. In the figure, an input terminal 1 receives a train of pel codes provided by quantizing a scanned two-level picture. Each pel code x of the train is applied to an REF code generator 52 having a line memory 46, and shift registers 47 and 48 where an REF code suitable for prediction coding of the screened picture is produced using the pel code x.

The reference code is composed of pel codes $a_1$ to $a_4$ neighboring the pel code x to be predicted, a pel code $b_2$ spaced by a distance D equal to the pitch of the screened picture from the pel code x, and pel codes $b_1$ and $b_3$ to $b_5$ neighboring the pel code $b_2$. The pel code x is supplied to the line memory 46 where it is delayed by one line (approximately 8,000 pel codes) to give a pel code y for providing the pel codes $a_2$ to $a_4$ and $b_4$ to $b_6$. Supplied with the pel code y, the shift register 48 produces the pel codes $a_4$ to $a_2$ and $b_4$ to $b_6$. The pel code x also is directly given to the shift register 47 to produce the pel code $b_2$ spaced by the pitch D of the screened picture from the pel code x and the pel codes $b_1$ and $b_3$ disposed on both sides of the pel code $b_2$. The REF code thus obtained is used as an address of a prediction code generator 49 comprising a read-only memory (ROM) which produces a prediction code P in response to the REF code. The prediction code P is applied to one of the inputs of an Exclusive-OR circuit (EOR) 50 of which the other input is given the pel code x. The EOR 50 performs an Exclusive-OR operation of the input code to give a prediction error code (error code) e. The error code e is successively given to a coder 51 for run-length coding. The thus obtained run-length code is then sent out from an output terminal 28 to the receiver 100B. The coder 51 may be a run length coder of the type shown in FIG. 12 of a paper entitled "Reduced-Time Facsimile Transmission by Digital Coding" by H. Wyle et al published in *IRE Transactions on Communication Systems*, Vol. CS-9, No. 3 (September issue, 1961), pp. 215–222 (Reference 5) or the one shown in FIGS. 6A to 6C of U.S. Pat. No. 3,833,900 (Reference 6). In the former case, a plurality of error codes e are run-length coded for each line by utilizing a run-length code shown in FIG. 4 in the paper. In place of the run-length coder, a suitable coder for data compression such as a block coder may be used as well for the coder 51.

The receiver 100B has a decoder 53 for decoding the output of the transmitter 100A into a plurality of error codes e each of which corresponds to the output of the EOR 50. An EOR 54, which is connected at one input to the decoder 53, reproduces the train of the pel codes x based on the error codes e delivered from the decoder 53. A REF code generator 52' generates a REF code corresponding to the REF code ($a_1$ to $a_4$ and $b_1$ to $b_6$) by using the pel code x. A prediction code generator 49' is connected at the input to the REF code generator 52 and at the output to the other input of the EOR 54. The generator 49' is composed of a ROM and forms a prediction code P corresponding to the output of the generator 49 by using the REF code sent from the REF code generator 52. The decoder 53 may be of the type shown in FIG. 1B of Reference 4.

Figure 3:
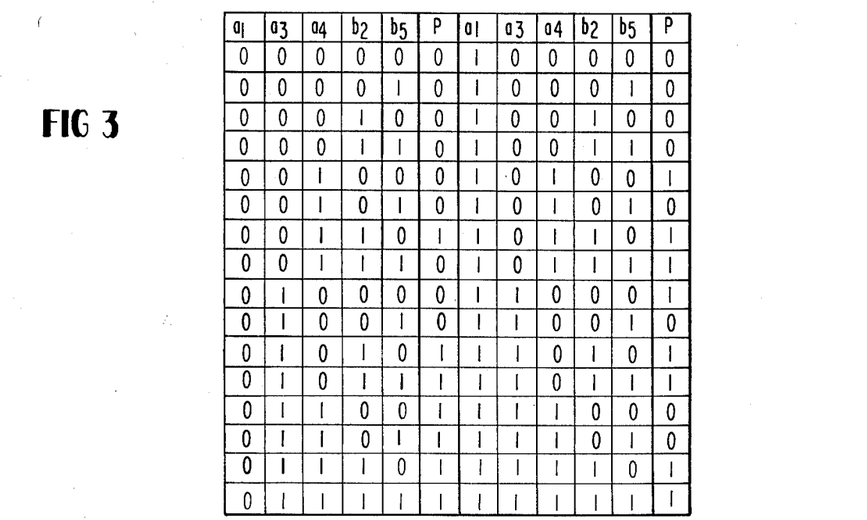
FIG. 3 illustrates the contents of a read only memory used in the first embodiment.

Turning now to FIG. 3, the contents of the prediction code generator 49 comprised of a ROM is shown. In the drawing, the REF code for addressing the generator 49 is comprised of the pel codes $a_1$, $a_3$, $a_4$, $b_2$ and $b_5$. When the REF code is "00000", for example, the prediction code P is "1".

Figure 4:
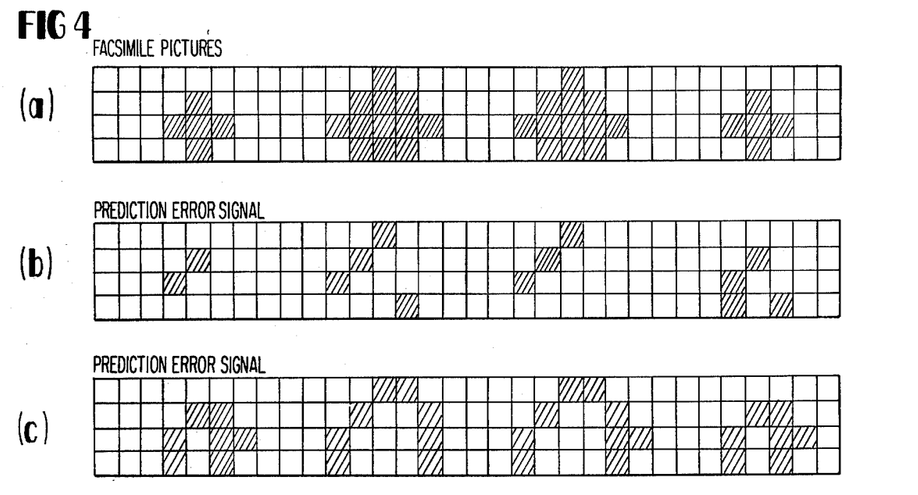
FIGS. 4(a) to (c) show the prediction technique of the present invention as compared with the conventional technique.

The prediction results of a facsimile picture of FIG. 4(a) according to the present invention and the conventional predictive coding technique described in Reference 1 are comparatively shown in FIGS. 4(b) and (c), respectively. In FIGS. 4(b) and (c), hatched blocks indicate failed prediction portions and blank blocks indicate prediction-hit portions. These results show that the use of the present invention is more advantageous than that of said conventional technique.

Though the present system of FIG. 1 can achieve the effective transmission of the screened pictures, its data compression efficiency is degraded in the case of transmission of documents including both the screened pictures and characters such as Chinese characters and Roman letters. Another embodiment designed to improve such a problem will be now described referring to FIGS. 5 to 16.

Figure 5:
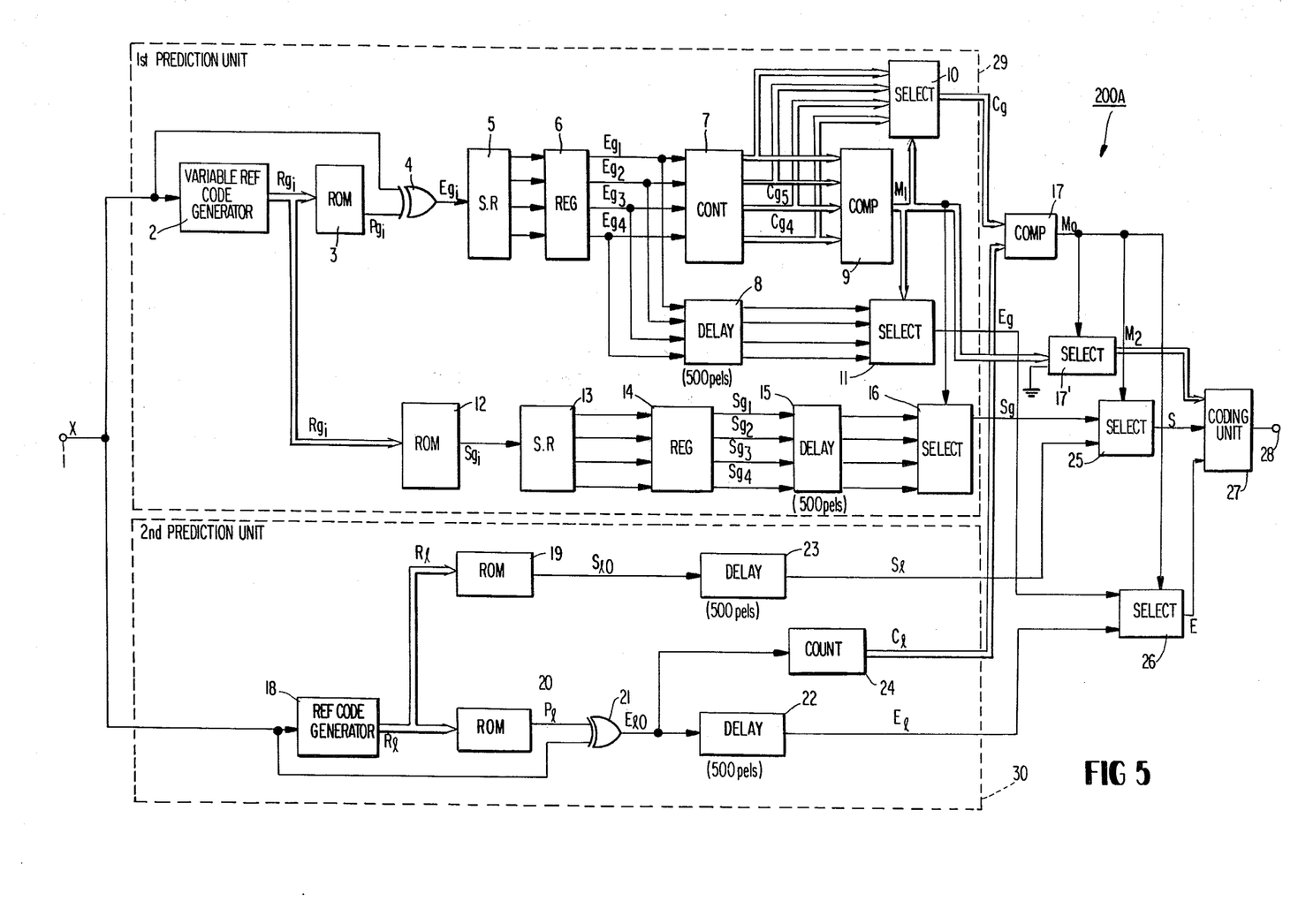
FIG. 5 is a block diagram of a transmitter for use in the second embodiment of the invention.

Referring to FIG. 5, a transmitter 200A for use in the second embodiment receives at an input terminal 1 a train of the pel codes x. Each pel code x of the train is then given to a first prediction unit 29 for the screened pictures and a second prediction unit 30 for printed characters. The units 29 and 30 produce error signals $E_g$ and $E_l$, respectively, count the prediction-hit-code-numbers of the error signals $E_g$ and $E_l$, and produce state signals $S_g$ and $S_l$, respectively. The state signals $S_g$ and $S_l$, to be described later in detail, are used to classify an error signal E consisting of a plurality of error codes into two groups in coding unit 27. For details of the formation of the state signal, reference is made to a paper entitled "Twodimentional Facsimile Source Encoding Based on a Markov Model" by Dieter-Preuβ, published in *Nachrichten Technische Zeitschrift*, Vol. 28, No. 10, 1975, pp. 358–363 (Reference 7). First and second signals $C_g$ and $C_l$ representative of the prediction-hit-code-numbers counted by the units 29 and 30 are compared by a comparator 17 to determine which one of those prediction units 29 and 30 has the larger prediction-hit-code-number. The comparator 17 produces a signal $M_o$ to show the comparison result. The state signals $S_g$ and $S_l$ and the error signals $E_g$ and $E_l$ are fed to selectors 25 and 26, respectively. In response to the output of the comparator 17, the selectors 25 and 26 select the state signal S and the error signal E given from the prediction unit having the higher prediction-hit probability. Reference numeral 17' designates a selector for producing a second mode signal $M_2$. Both error signal E and the state signal S are sent to the coding unit 27 together with the mode signal $M_2$ from the selector 17' so that the error signal E is run-length coded depending on the state signal S.

The operations of the prediction units 29 and 30 of FIG. 5 will be described in more detail. A variable REF code generator 2 produces four reference codes $R_{gi}$ ($i=1\sim4$) depending on four different pitches D (see FIG. 2) using the pel code x. In response to the pel code x, a REF code generator 18 produces a REF code $R_l$. These REF codes $R_{gi}$ and $R_l$ respectively are applied to prediction code generators 3 and 20 consisting of ROMs to give first and second prediction codes $P_{gi}$ ($i=1\sim4$) and $P_l$. The prediction codes $P_{gi}$, together with the pel code x from the input terminal 1, are given to an EOR 4 which produces four error codes $E_{gi}$ ($i=1\sim 4$). Similarly, the prediction code $R_l$ and the pel code x are both applied to another EOR 21 and, upon reception of the present pel code x and the prediction code $P_l$, the EOR 21 produces an error code $E_o$. The four error codes $E_{gi}$ from the EOR 4 are supplied to a serial to parallel converter having a shift register 5 and a register 6, and are converted into four error codes $E_{g1}$ to $E_{g4}$ corresponding to the four REF codes $R_{g1}$ to $R_{g4}$, respectively. In response to the error codes $E_{g1}$ to $E_{g4}$, a counter 7 counts the prediction-hit-code-numbers among the respective 500 error codes $E_{g1}$ to $E_{g4}$ corresponding to 500 pel codes. The prediction-hit-code-number-indicating signals $C_{g1}$ to $C_{g4}$ given from the counter 7 are supplied to the comparator 9. The comparator 9 produces a first mode signal $M_1$ indicative of an error signal $E_g$ with the largest prediction-hit-code-number by comparing the signals $C_{g1}$ to $C_{g4}$ with one another. The signals $C_{g1}$ to $C_{g4}$ are also sent to the selector 10, which selects the error signal $E_g$ with the largest prediction-hit-code-number based on the output $M_1$ of the comparator 9. The four error codes $E_{g1}$ to $E_{g4}$ are delayed by 500 pel codes in a delay circuit 8 and applied to the selector 11. Upon reception of the output $M_1$ of the comparator 9, the error signal $E_g$ with the largest prediction-hit-code-number is fed to the selector 26. Responsive to the error code $E_{lo}$ of the EOR 21, a counter 24 counts the prediction-hit-code-number among 500 error codes $E_{lo}$ corresponding to 500 pel codes supplied thereto so as to give a count signal $C_2$ to the comparator 17. The error code $E_{lo}$ is delayed by 500 pel codes in a delay circuit 22, and supplied to the selector 26. The four REF codes $R_{gi}$ ($i=1\sim 4$) of the variable REF code generator 2 are also applied to a state code generator 12 of ROM to form four state codes $S_{gi}$ ($i=1\sim 4$) corresponding to the REF codes $R_{gi}$. The state codes $S_{gi}$ are converted into four state codes $S_{g1}$ to $S_{g4}$ corresponding to the four REF signals $R_{gi}$ by an S/P converter including registers 13 and 14. These four state codes $S_{g1}$ to $S_{g4}$ are delayed in a delay circuit 15 by 500 pel codes. The delayed state codes $S_{g1}$ to $S_{g4}$ are sent to a selector 16. The selector 16 responsive to the output $M_1$ of the comparator 9 selects a state signal $S_g$ corresponding to the signal $C_g$ with the largest prediction-hit-code-number. Similarly, the output $R_l$ of the REF code generator 18 is given to a state code generator 19 of ROM where the state code $S_{lo}$ is produced corresponding to the REF code $R_l$. The state code $S_{lo}$ is delayed in the delay circuit 23 by 500 pel codes, and applied to the selector 25. The first mode signal $M_1$ is supplied to the selector 25 which produces a second mode signal $M_2$ on the basis of the output of the comparator 17. The second mode signal $M_2$ indicates which one of the error codes $E_{g1}$ to $E_{g4}$ and $E_{lo}$ has been supplied to the coding unit 27.

Figure 2:
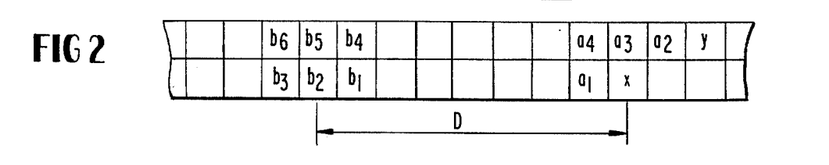
FIG. 2 is a diagram for schematically explaining how to predict the present pel code.
Figure 6:
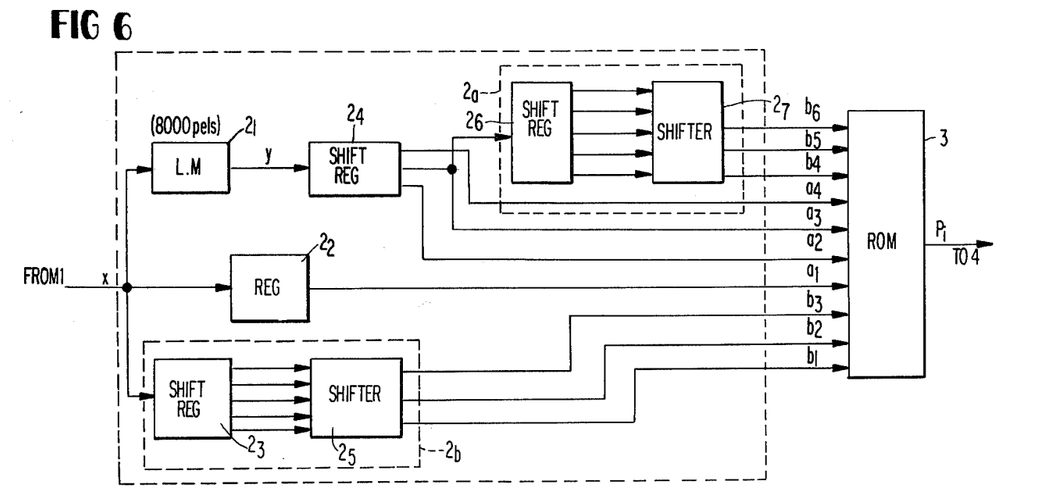
FIGS. 6, 7 and 9 show a part of the transmitter shown in FIG. 5.

Details of the variable REF code generator 2 will be described with reference to FIGS. 2 and 6. The generator 2 has the REF code generator 52 shown in FIG. 1 and variable delay circuits 2a and 2b for providing REF signals corresponding to a variation of the pitch of the screened picture. In FIG. 6, the pel code x given through the input terminal 1 is sent to a line memory $2_1$ for providing a delay of approximately one line (about 8,000 pel codes), a register $2_2$ for providing a delay of one pel code, and the variable delay circuit 2b composed of a shift resistor $2_3$ and a shifter $2_5$. The line memory $2_1$ produces a pel code y to give a shift resistor $2_4$. The shift register $2_4$ delays by three pel codes the pel code y to produce the pel codes $a_2$ to $a_4$. Upon reception of the pel code x, the register $2_2$ produces the pel code $a_1$ for application to the ROM 3. The variable delay circuit 2b produces the pel codes $b_1$ to $b_3$ corresponding to the pitch D varying according to the shift pulses delivered to a shifter $2_5$. The pel code $a_4$ derived from the shift resistor $2_4$, which is directly supplied to the ROM 3, is also given to the variable delay circuit 2a having a shift resistor $2_6$ and a shifter $2_7$. In response to shift pulses, the shifter $2_7$ produces the pel codes $b_4$ to $b_6$ with different pitches D. As previously stated, the prediction code generator 3 forms prediction codes $P_{gi}$ on the basis of all the pel codes $a_1$ to $a_4$ and $b_1$ to $b_6$, i.e. an REF codes $R_{gi}$. Proper timing pulses are applied from a clock source 400 shown in FIG. 13 to the shift registers $2_3$, $2_4$ and $2_6$, the line memory $2_1$ and the shifters $2_5$ and $2_7$. For simplicity, those timing pulses are not illustrated in the figures.

Figure 7:
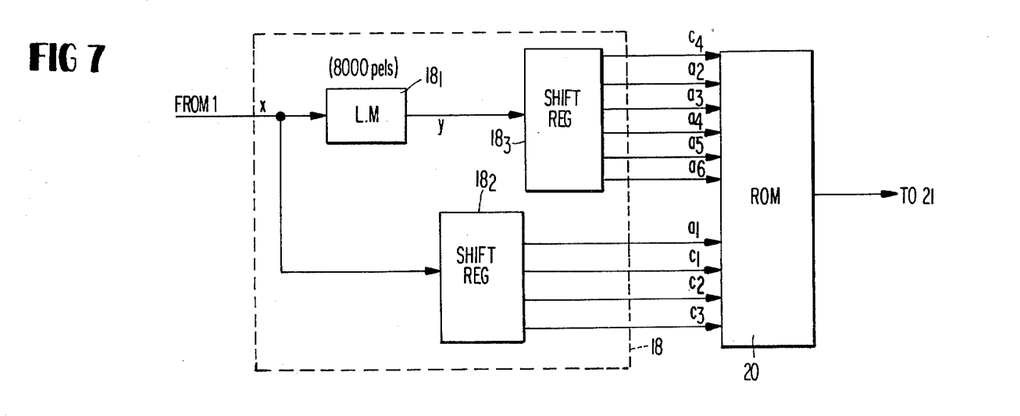
Figure 8:
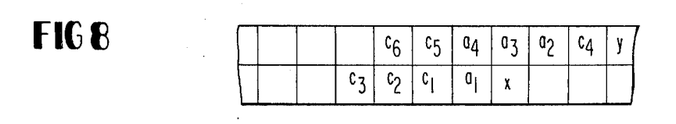
FIG. 8 schematically illustrates how to predict the present pel code in the second embodiment.

Details of the REF code generator 18 will be described with reference to FIGS. 7 and 8. As shown in FIG. 8, the REF code generator 18 produces the pel codes $a_1$ to $a_4$ contiguous to the pel code x and the pel codes $c_1$ to $c_6$ located continuously to those pel codes $a_1$ to $a_4$. These pel codes $a_1$ to $a_4$ and $c_1$ to $c_6$ are used for the prediction of the pel code x. In FIG. 7, the pel code x is given to a line memory $18_1$ and a shift register $18_2$. The pel code x supplied to the line memory $18_1$ is delayed by about one line (8,000 pel codes) to provide the pel code y. The pel code y is shifted in the shift register $18_3$ to form the pel codes $c_4$ and $a_2$ to $a_6$ which are then directly given to the ROM 20. The shift register $18_2$ converts the pel code x into the pel codes $a_1$ and $c_1$ to $c_3$ to be applied to the ROM 20. The REF code consisting of the pel codes $a_1$ to $a_4$ and $c_1$ to $c_6$ is converted into a prediction code $P_l$ by the ROM 20.

Figure 9:
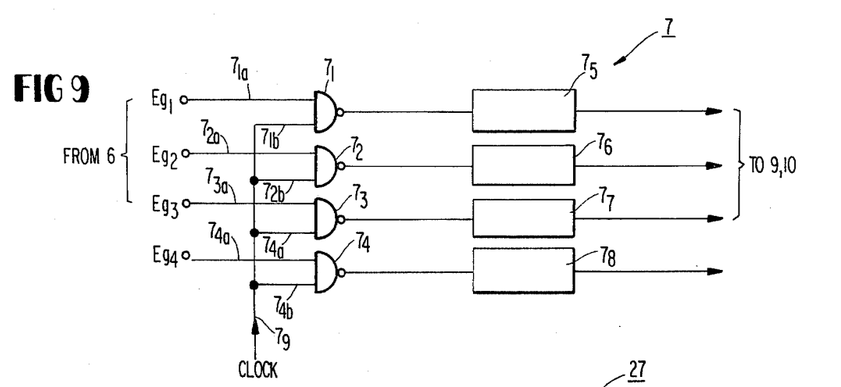

Turning now to FIG. 9 which shows in detail the counter 7 of FIG. 5, the four error codes $E_{g1}$ to $E_{g4}$ derived from the register 6 are fed to input terminals $7_{1a}$ to $7_{4a}$ of NAND gates $7_1$ to $7_4$ of which the other terminals $7_{1b}$ to $7_{4b}$ are coupled through a signal line $7_9$ with clock signals. When binary code "0" indicating the correct prediction is applied to the input terminals $7_{1a}$ to $7_{4a}$ of the NAND gate $7_1$ to $7_4$, each of the gates produces a "1". Counters $7_5$ to $7_8$ coupled to the outputs of the NAND gates $7_1$ to $7_4$ are responsive to the output from the NAND gates $7_1$ to $7_4$ to count the prediction-hit code-number.

Figure 10:
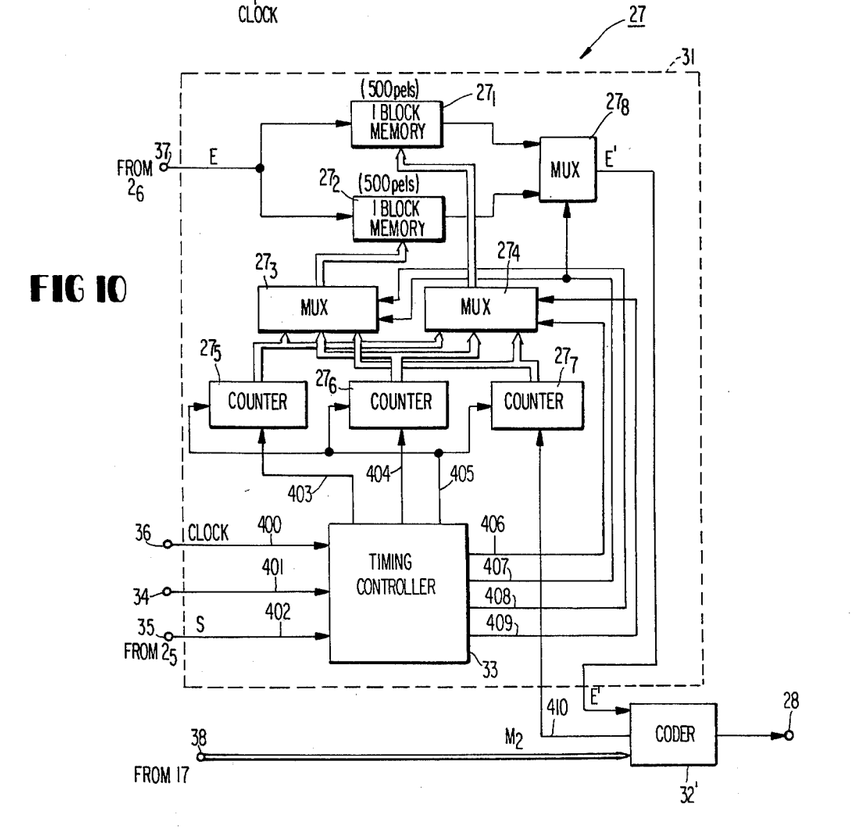
FIG. 10 is a block diagram of a part of FIG. 5.

FIG. 10 illustrates the circuit diagram of the coding unit of FIG. 5. As described later, the error signal E from the selector 25 is arranged by an arrangement converting circuit 31 for each block (500 pel codes) on the basis of the state signal S from the selector 25. Thus arranged signal E' is subjected to run-length coding together with the mode signal $M_2$ given from the selector 17'.

The converting circuit 31 will now be described in greater detail referring to FIG. 10. In response to a load signal 405 from a timing controller 33, addresses 0 and 499 are loaded into counters $27_5$ and $27_6$ serving as write address generator. The contents of the counters $27_5$ and $27_6$ respectively are counted up and down in accordance with control signals 403 and 404 which are produced from the controller 33 depending on "0" or "1" of the state signals. Also, in response to a load signal 405, address 0 is loaded into a counter $27_7$ serving as a read address generator and is counted up every time a read-out request signal 410 from a coder 32' is given thereto. Control signals 408 and 407 from the timing controller 33 cause a multiplexer (MUX) $27_3$ to select one of the counters $27_5$ to $27_6$. Similarly, control signals 406 and 409 from the timing controller 33 cause a multiplexer (MUX) $27_4$ to select one of the counters $27_5$ to $27_6$. The control signal 407 also causes an MUX $27_8$ to select one of the one-block memories $27_1$ and $27_2$ each of which has a capacity of 500 pel codes. The control signals 406 to 409 are given in their mutual relationship such that, when the MUX $27_3$ selects the counter $27_5$ or $27_6$, the MUX $27_4$ selects the counter $27_7$, and, when the MUX $27_3$ selects the counter $27_7$, the MUX $27_4$ selects the counter $27_5$ or $27_6$. The outputs of the MUX $27_3$ and $27_4$ are applied as read or write addresses to the one-block memories $27_1$ to $27_2$ for storing the error signal E delivered from the selector 26. For example, when the MUXs $27_3$ and $27_4$ select the counters $27_5$, $27_6$ or $27_7$, a write address is given to the memory $27_2$ and a read address is applied to the memory $27_1$. According to the control signal 408 from the controller 33, the MUX $27_8$ selects the memory $27_1$ or $27_2$ of which the output is fed to the coder 32'.

Figure 11:
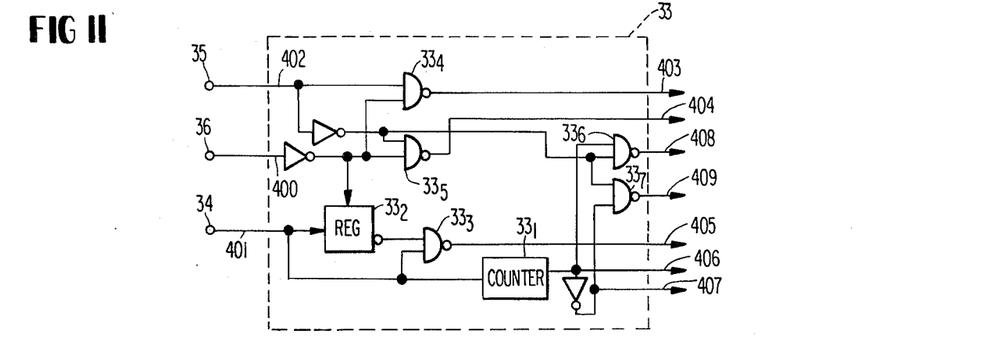
FIG. 11 shows a circuit diagram of a part of the FIG. 10.
Figure 12:
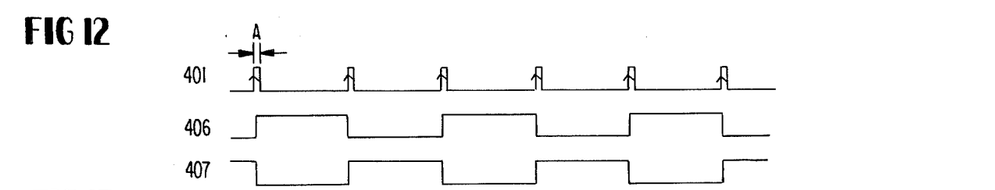
FIGS. 12, 13 and 14 show waveforms for explaining the circuit operation of FIG. 10.
Figure 13:
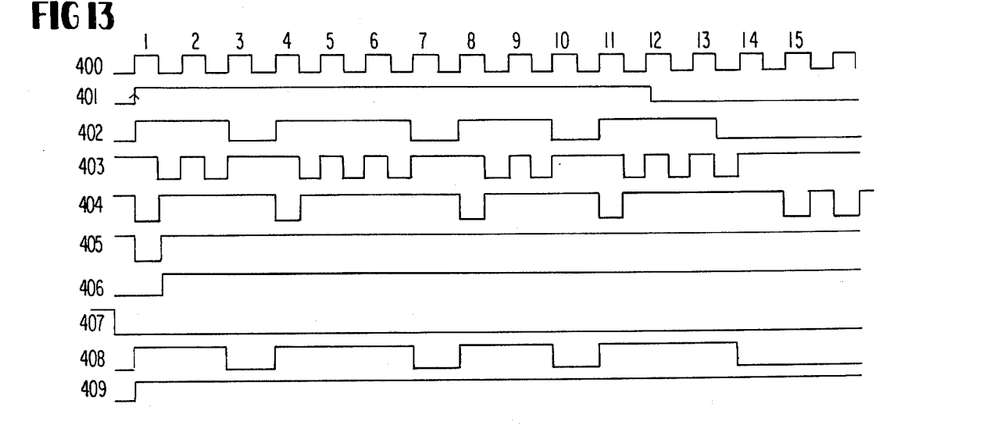

The timing operation of the controller 33 will be described with reference to FIGS. 11 to 13. Referring to FIG. 11, an input terminal 34 is supplied with a block synchronizing signal (401 of FIG. 12) obtained by frequency-dividing a clock signal to 1/500. The signal 401 is supplied to a counter $33_1$ where a control signal 406 is produced by frequency-dividing the signal 401 to ½ (406 of FIG. 12). A control signal 407 (407 of FIG. 12) is obtained by inverting the control signal 406. The block synchronizing signal 401, which is illustrated in an enlarged manner in FIG. 13, is stored in the register $33_2$ in response to the inverted clock signal 400 and is inverted. The output of the register $33_2$ is sent to one input terminal of the NAND gate $33_3$ and the signal 401 is applied to the other input terminal of the same, so that the NAND gate $33_3$ produces a control signal 405. When a NAND gate $33_4$ receives at one input terminal a state signal 402 from the terminal 35 and at the other input terminal the inverted clock signal 400, it produces a control signal 403. The state signal 402 is inverted and is then applied to one input terminal of an NAND gate $33_5$. This inverted signal, together with the inverted clock signal 400 applied to the other input terminal of the gate $33_5$, enables the NAND gate $33_5$ to produce a control signal 404. The control signals 407 and 406 are respectively given to one input terminals of NAND gates $33_6$ and $33_7$. Under this condition, the NAND gate $33_6$ produces a control signal 408 when it receives at the other input terminal the inverted clock signal 400. Similarly, the NAND gate $33_7$ produces a control signal 409.

Figure 14:
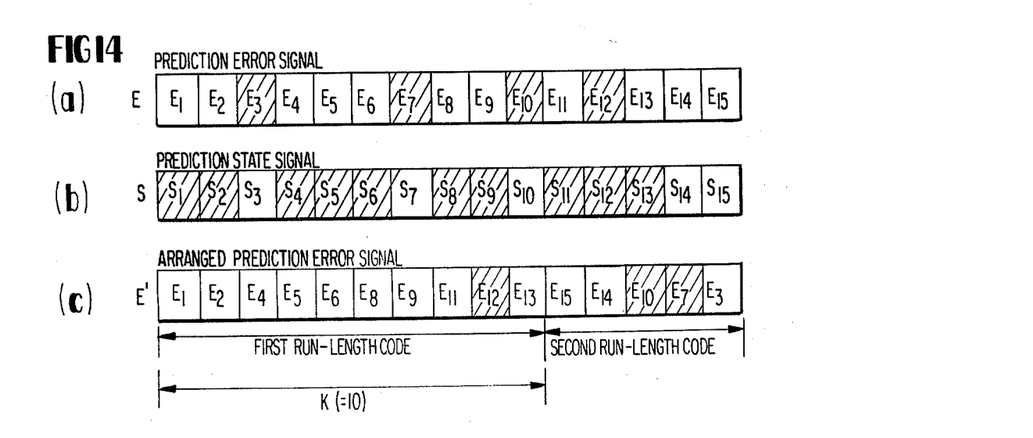

The operation of the coding unit 27 of FIG. 10 will be described in detail referring to FIGS. 13 and 14. In the description, it is assumed that the number of the error codes is 15. At a clock 1 of the clock signal 400 of FIG. 13, upon reception of the block synchronizing signal 401, the controller 33 generates a load signal 405. The load signal 405 is supplied to the counters $27_5$ to $27_7$ to provide addresses "0", "14" and "0". The controller 33 also supplies control signals 407, 408 and 406, 409 to the MUXs $27_3$ and $27_4$. Assuming that the MUXs $27_3$ and $27_4$ select the counter $27_5$ when the control signals 407 and 408 are "0, 1", and that they select the counter $27_6$ when the control signals are "0, 0", and that they select the counter $27_7$ when signals are "1, 1", the control signals 407 and 408 are always kept at "0, 1" or "0, 0" during the time period of clocks 1 through 15. Accordingly, MUX $27_3$ selects the counter $27_5$ or $27_6$ during the time period of the clocks 1 through 15. Similarly, the control signals 406 and 409 are "1, 1" during the time period of the clocks 1 through 15 so that the MUX $27_4$ selects the counter $27_7$. The MUX $27_8$ selects the memory $27_2$ when the control signal 407 is "1". At the clock 1, the MUX $27_3$ selects the counter $27_5$ so that the output "0" of the counter $27_5$ is applied as a write address to the memory $27_2$ and therefore, the error code $E_1$ ((a) of FIG. 14) supplied from the terminal 37 is loaded into the address 0. At the end of the clock 1, the controller 33, in response to the state code "1", supplies a pulse to the counter $27_5$ to render the address "1". At the clocck 2, the MUX $27_3$ still selects the counter $27_5$ so that the error code $E_2$ is loaded into the address 1 of the memory $27_2$. At the clock 3, the MUX $27_3$ selects the counter $27_6$ to give the output of the counter $27_6$ to the memory $27_2$ as a write address. As a result, the error code $E_3$ is loaded into the addess 14 of the memory $27_2$. In this manner, the error codes $E_1$ to $E_{15}$ are arranged into the addresses 0 to 14 as shown in FIG. 14 (c) and then written into the memory $27_2$.

On the other hand, during the period of the clocks 1 through 15 the MUX $27_8$ selects the memory $27_1$ in response to the control signal 407. Therefore, the counter $27_7$ which is given a read-out request signal from the coder 32', reads out the contents of the memory $27_1$ to supply its contents to the coder 32'.

The construction and the operation of the coder 32' of FIG. 10 will be described hereunder. The coder 32' includes first and second coders (of the type indicated by numeral 30 of FIG. 1A in Reference 4) for performing first and second run-length coding to be stated later, a plurality of signal paths (corresponding to the number of the signal paths $M_2$ of the transmitter 200A of FIG. 5) for joining the mode signal $M_2$ to a synchronizing signal marking the boundary of each scanning line, and a clock signal generator (not shown) for generating a read-out request signal 410 in synchronism with the clock signal 400. Said read-out request signal is used for reading out an arranged error signal E' from the one-block memory $27_1$ or $27_2$ shown in FIG. 10. The operation of the coder 32' is performed through three steps in the following manner. In the first step, the second mode signal $M_2$ indicating the selected error signal inputed from the terminal 38 is joined to the synchronizing signal indicative of the boundary of each scanning line. In the second step, error codes stored in the addresses 0 to k of the memory $27_1$ or $27_2$ are coded into the first run-length codes. In the tird step, other error codes stored in the addresses (k+1) to 499 are coded into the second run-length codes. The value of k is previously calculated in a statistical manner through actually transmitting various kinds of newspapar pages. As shown in FIG. 14(c), when the error signal E is observed every block on the assumption that one block consists of 15 pel codes and k=10, the error codes with the prediction state (S=1) are not necessarily stored in the address 0 to 9 (FIG. 14(c)), and there is a case where the total number of the error codes $E_1$ to $E_{13}$ with this state (S=1) (FIG. 14(c)) is larger or smaller than 10. However, on the average, the error codes with S=1 state are stored in the addresses 0 to 10. The value k takes different fixed values for the character portions and the screened picture portions, respectively. This is due to the fact that since the probability that the state signal S takes "1" is substantially different between those portions, different run-length coding can be applied to those portions, thereby improving the coding efficiency. More in detail, if k is selected to be 10, there is a high possibility that the error codes with the first prediction state (S=1) are loaded in the addresses 0 to 10 of the one block member $27_1$ and that the error codes with the second prediction state (S=0) are loaded in the addresses 11 to 14. As a result, a different run-length distribution is formed in the respective cases of the error signals with S=1 and S=0. This means that the different run-length coding can be applied to the different distribution portions as shown in FIG. 14(c).

The explanation will next be given about a case that the arranged error signal E' in FIG. 14(c), which is already arranged by the converting circuit 31 of FIG. 10, is coded by means of such a run-length coder 32'. In the graphical representation of the error signal E', the hatched portion indicates the prediction-hit state and the blank portion indicates the failed prediction state. Similarly, in FIG. 14(b), the hatched portion indicates the first prediction state (S=1) and the blank portion indicates the second prediction state (S=0). The error signal E' is divided into two sections depending on the states S=1 and 0, which are coded by different run-length codes. More specifically, the first run-length coding is performed for the error codes $E_1$ to $E_{13}$ of the error signal E' and the second run-length coding is performed for the error codes $E_{15}$ to $E_3$. Actually, the error codes ($E_1$ to $E_{12}$) in which the error code $E_{12}$ shows a failed prediction-state are run-length coded as a single run. In the error signal E', the error codes $E_1$ to $E_{12}$ have 9 run-lengths, the error codes $E_{13}$ to $E_{10}$ have 4 run-lengths and error codes $E_7$ and $E_3$ have each one 30 run-length. Specifically, the first run-length coding is performed for the 9 run-length and the 4 run-length and the second run-length coding is performed for one run-length.

Figure 15:
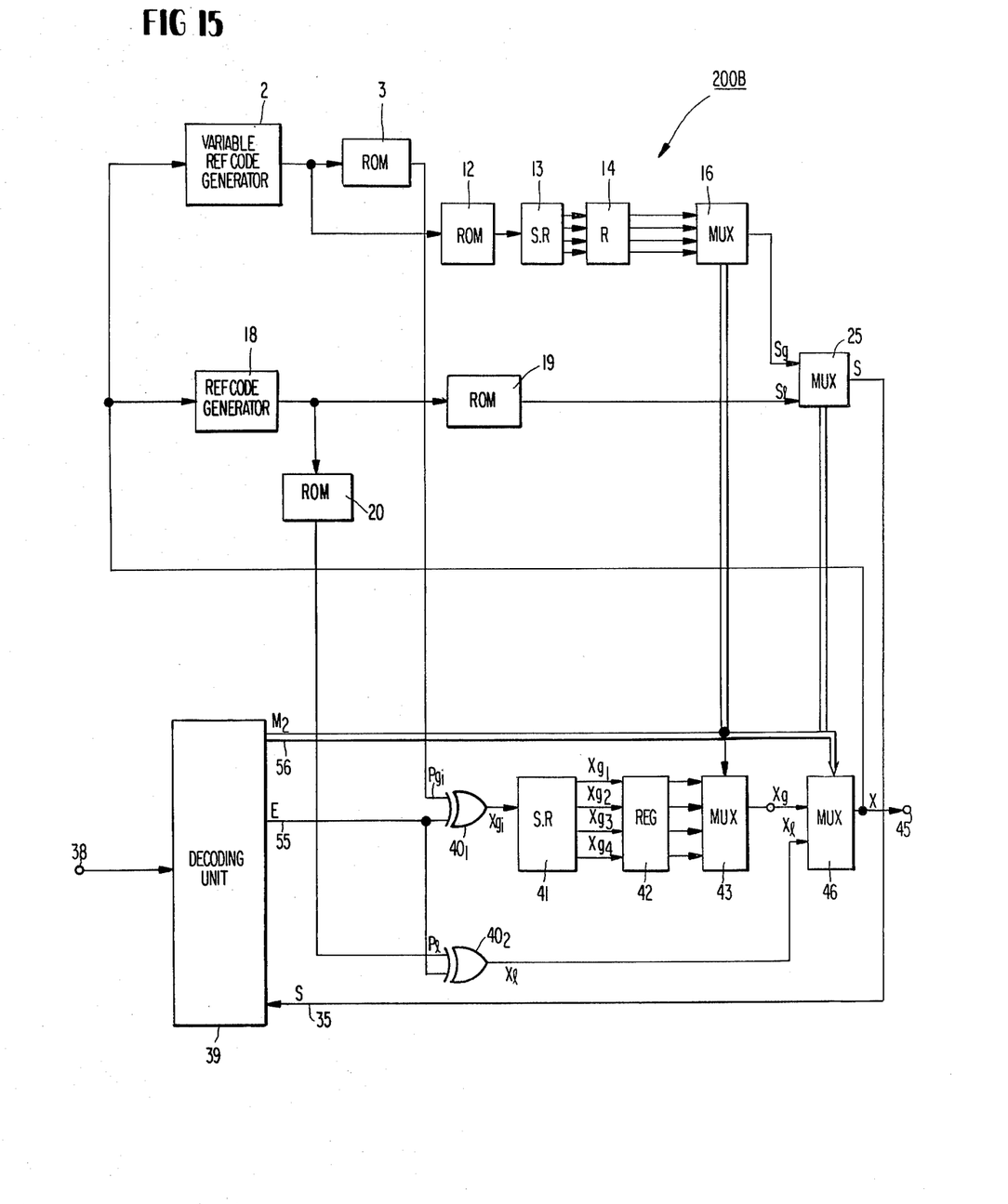
FIG. 15 shows a block diagram of a receiver for use in the second embodiment.

Referring to FIG. 15 which shows a block diagram of a receiver 200B for use in the second embodiment of the invention, the receiver performs a reverse operation of the transmitter of FIG. 5. In FIG. 15, like reference numerals are used to designate like parts or portions of FIG. 5. The coded output signal supplied from the transmitter 200A to an input terminal 38 is sent to a decoding unit 39. As a result, the output signal is converted into an error E and a second mode signal $M_2$. The error signal E is given to an input terminal of each of EORs $40_1$ and $40_2$. In response to a prediction codes $P_{gi}$ derived from an ROM 3 at the other input terminal, the EOR $40_1$ produces a first eligible pel codes $Y_{gi}$. ($i=1\sim4$) for giving the present pel code x of FIG. 5. Similarly, in response to a prediction code $P_l$ from the ROM 20 at the other input terminal, the EOR $40_2$ produces a second eligible pel code $X_l$ given for the present pel code x. The first and second eligible pel codes $X_{gi}$ and $X_l$ are used for providing the present pel code x of the screened picture or characters. As described above, the variable REF code generator 2 generates four kinds of REF codes for one pel code. For this reason, four eligible pel codes $X_{gi}$ for giving the present pel code x are produced for one pel code. The four pel codes $X_{gi}$ are given to a serial-parallel converter having a shift register 41 and a register 42 and converted into parallel third eligible pel codes $X_{gi}$ to $X_{g4}$. These pel codes $X_{g1}$ to $X_{g4}$ are given to an MUX 43 which receives as a selection signal the mode signal $M_2$ from the decoding unit 39. When the mode signal $M_2$ is a mode signal for the screened picture, the MUX 43 selects one of the third pel codes $X_{g1}$ to $X_{g4}$. When it is a character-representing signal, the MUX 43 produces no output. The output of the MUX 43 is applied to MUX 44 supplied with the output $X_l$ of EOR $40_2$. The MUX 44 selects either $X_g$ or $X_l$ in accordance with the mode signal $M_2$. The output x of the MUX 44 is supplied to an output terminal 45 as the present pel code x, to an REF code generator 18 for producing the prediction code, and to a variable REF code generator 2. The state codes $S_g$ and $S_l$ given from the ROM 19 and MUX 16 are fed to the MUX 25 where one of them is selected based on the mode signal $M_2$. The output S consisting of a plurality of state codes of the MUX 25 is supplied to the decoding unit 39.

Figure 16:
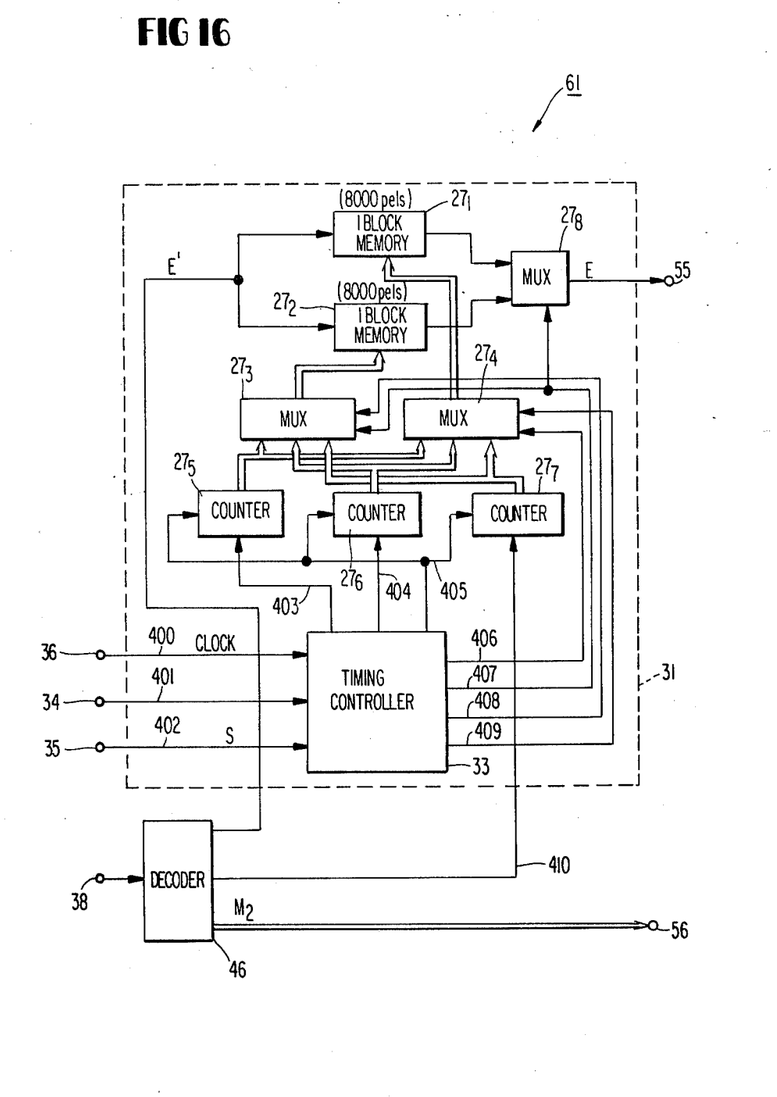
FIG. 16 is a block diagram of a part of FIG. 15.

FIG. 16 shows a circuit diagram of the decoding unit 39. The circuit construction of the decoding unit 39 is the same as that of the coding unit 27 shown in FIG. 10 except that a decoder 46 is used, that encounters $27_5$ and $27_6$ produce read addresses, and that a counter $27_7$ produces a write address. The decoder 46 has a circuit construction similar to the decoder shown in FIGS. 6A to 6C of Reference 4, which is a combination of known logic circuits for performing the operation of the block 54 of FIG. 1B of the same reference. The coded signal supplied from the transmitter 200A to a terminal 38 is decoded by decoder 46 into the arranged error signal E' shown in FIG. 14. The error signal E' is sequentially written into the memory $27_2$ from address 0 in response to a write signal supplied from the decoder 46 to the counter $27_7$. The state signal S (FIG. 14) delivered from MUX 25 of FIG. 15 is supplied to the terminal 35 of the controller 33 and then the controller 33, in accordance with the state signal S, supplies pulses to the counters $27_5$ and $27_6$ serving as read address generators of the memory $27_2$. As a result, the error signal E' is read out from the memory $27_2$ and is supplied to a terminal 55 through the MUX $27_8$. For example, when the state codes $S_1$ and $S_2$ are "1", the error codes $E_1$ and $E_2$ are read out from the addresses 0 and 1, respectively. In this case, when the state code $S_3$ is "0", the error code $E_3$ is read out from the address 14 rather than from the address 3. In other words, when the state signal S is "1", the read operation starts from the beginning of the addresses. Conversely, when the state signal S is "0", the read operation starts from the end of the addresses. In this way, the arranged error signal E' is restored to the error signal E before being arranged.

From the foregoing description, the present invention achieves an efficient digital facsimile transmission for the documents such as newspaper pages.

What is claimed is:

1. A digital facsimile system adapted to transmit picture signals representative of newspapar pages and the like having a printed character portion and a screened picture portion, said system having a transmitter and a receiver, wherein said transmitter comprises: an input terminal for receiving a digitized facsimile signal in the form of a train of pel codes formed by scanning a picture to be transmitted including black and white pels and digitizing the output of said picture scanning; a first reference code generator including first means for providing from the present pel code first pel codes contiguous to said present pel code, second means for providing a second pel code spaced by the pitch of said screened picture from said present pel code, and third means for providing third pel codes near said second pel code, said first reference code generator producing a first reference code including said first to third pel codes; means for producing a first prediction code for said present pel code on the basis of said first reference code; fourth means for providing a prediction error code from said first prediction code and said present pel code; and means for run-length coding the prediction error signal consisting of a plurality of said first prediction error codes successively delivered from said fourth means; and wherein said receiver comprises: means for decoding the coded signal transmitted from said transmitter to reproduce said prediction error signal; means responsive to the output of said decoding means for producing said present pel code from said each prediction error code of said prediction error signal; means responsive to the output of said present code generating means for producing a second reference code corresponding to said first reference code; and means responsive to said second reference code for producing a second prediction code corresponding to said first prediction code and for applying said second prediction code to said present pel code generating means.

2. A digital facsimile system adapted to transmit picture signals representative of newspaper pages and the like having a printed character portion and a screened picture portion, said system having a transmitter and a receiver, wherein said transmitter comprises: an input terminal for receiving a digitized facsimile signal in the form of a train of pel codes formed by scanning a picture to be transmitted including black and white pels and digitizing the output of said picture scanning; a first variable reference code generator including first means for providing from the present pel code first pel codes contiguous to said present pel code, second means for providing a second pel code spaced by the pitch of said screened picture from said present pel code, third means for providing third pel codes near said second pel code, and fourth means for changing by given times said pitch distance between said present pel and said second pel codes, said first variable reference code generator producing first variable reference codes corresponding to said changed distances; means for producing first prediction codes from said first variable reference codes corresponding to said changed distances; means for providing first prediction error codes corresponding to said changed distances from said first prediction codes and said present pel code; means for counting the prediction-hit-code-numbers of first prediction error signals each of which consists of a plurality of said first prediction error codes during a given period of time; means for storing said first prediction error signals during said given period; means for comparing said prediction-hit-code-numbers during said given period and for producing a mode signal indicative of a prediction error signal with the largest prediction-hit-code number among said first prediction error signals; first selection means for selecting from said storing means said prediction error signal with said largest prediction-hit-code-number as a second prediction error signal; and means for coding said second prediction error signal and said mode signal; and wherein said receiver comprises: means for decoding the output signal transmitted from said transmitter to reproduce said mode signal and said second prediction error signal; means responsive to the output of said decoding means for producing first eligible pel codes given for said present pel code corresponding to said changed distances from said second prediction error signal; second selection means for selecting from said first eligible pel codes given for said present pel code said present pel code corresponding to said mode signal; second variable reference code generator for generating second variable reference codes corresponding to said first variable reference codes on the basis of said present pel code delivered from said second selection means; and a second prediction code generator for producing second prediction codes corresponding to said first prediction codes on the basis of said second variable reference codes and for supplying second prediction codes to said eligible code generator.

3. A digital facsimile system adapted to transmit picture signals representative of newspaper pages and the like having a printed character portion and a screened picture portion, said system having a transmitter and a receiver, wherein the transmitter comprises: an input terminal for receiving a digitized facsimile signal in the form of a train of pel codes formed by scanning a picture to be transmitted including black and white pels and digitizing the output of said picture scanning; a first variable reference code generator including first means for providing from the present pel code first pel codes contiguous to said present pel code, second means for providing a second pel code spaced by the pitch of said screened picture from said present pel code, third means for providing third pel codes near said second pel code, and fourth means for charging by given times said pitch distance between said present pel and said second pel codes, said first variable reference code generator producing first variable reference codes corresponding to said changed distances; first code generating means for producing first prediction codes from said variable reference codes corresponding to said changed distances; first error code means for providing first prediction error codes corresponding to said changed distances from said first prediction codes and said present pel code; first counting means for counting the prediction-hit-code-numbers of said first prediction error signals each of which consists of a plurality of said first prediction error codes during a given period of time; first storage means for storing said first prediction error signals during said given period; first comparing means for comparing said prediction-hit-code numbers during said given period and for producing a first mode signal indicative of a prediction error signal with the largest prediction-hit-code nunber among said first prediction error signals; first selection means for selecting from said first storage means said prediction error signal with said largest prediction-hit-code number as a second prediction signal; a second reference code generator including fifth means for providing from the present pel code fourth pel codes contiguous to said present pel code, sixth means for providing a first pel-code spaced by the pitch of said screened picture from said present pel code, and seventh means for providing sixth pel codes near said fifth pel code, said second reference generator producing a second reference code including said fourth, fifth and sixth pel codes; second code generating means for producing a second prediction code for said present pel code on the basis of said second reference code; second error code means for providing a second prediction error code from said second prediction code and said present pel code; second counting means for counting the prediction-hit-code number among said second prediction error code; second comparing means for comparing the output of said first selection means and the output of said second counting means and for producing a second mode signal indicative of a prediction error signal with the largest prediction-hit-code number; second selection means for selecting the prediction error signal with the largest prediction-hit-code number on the basis of said second mode signal; and means for coding the selected prediction error signal with the largest prediction-hit-code and said second mode signal; and wherein said receiver comprises: means for decoding the output signal transmitted from said transmitter to reproduce said second mode signal and said largest prediction-hit-code; means responsive to the output of said decoding means for producing first eligible pel codes given for said present pel code corresponding to said changed distances from said second prediction error signal; third selection means for selecting from said first eligible pel-codes given for said present pel code said present pel code corresponding to said second mode signal; means responsive to the output of said decoding means for producing said present pel code from each prediction error code; fourth selection means for selecting the output of said third selection means or said eligible code generator means corresponding to said second mode signal; third variable reference code generator for generating second variable reference codes corresponding to said first variable reference codes on the basis of said present pel code delivered from said fourth selection means; a third prediction code generator for producing third prediction codes corresponding to said first prediction codes on the basis of said second variable reference codes and for supplying third prediction codes to said eligible code generator means; means responsive to said present code generating means for producing a fourth reference code corresponding to said second reference code; and means responsive to said fourth reference code for producing a fourth prediction code corresponding to said second prediction code and for applying said fourth prediction code to said present pel code generating means.

4. A digital facsimile system as recited in claim 1, 2 or 3 wherein each of said prediction code generating means is a read only memory.

5. A digital fascimile system adapted to transmit picture signals representative of newspapar pages and the like having a printed character portion and a screened picture portion, said system having a transmitter and a receiver, wherein said transmitter comprising: an input terminal for receiving a digitized facsimile signal in the form of a train of pel codes formed by scanning a picture to be transmitted including black and white pels and digitizing the output of said picture scanning; a first variable reference code generator including first means responsive to the present pel code for providing first pel codes contiguous to said present pel code, second means responsive to said present pel code for providing a second pel code spaced by the pitch of said screened picture, third means responsive to said second pel code for providing third pel codes near said second pel code, and fourth means responsive to said first and second pel codes for changing by given times said pitch distance between said present pel and second pel codes, said first variable reference code generator responsive to said present pel code producing first variable reference codes corresponding to said changed distances; means responsive to said first variable reference codes for producing first prediction codes corresponding to said changed distances; fifth means for providing first prediction error codes corresponding to said changed distances in response to said first prediction codes and said present pel code; means for counting the prediction-hit-code-numbers of first prediction error signal each of which consists of a plurality of said first prediction error codes during a given period of time; first storing means for storing said first prediction error signals during said given period; first comparing means for comparing said prediction-hit-code-numbers among said first prediction error signals during said given period and for producing a first mode signal indicative of a prediction error signal with the largest prediction-hit-code number among said first prediction error signals; first selection means responsive to said first mode signal for selecting from said first storing means one prediction error signal with said largest prediction-hit-code-number as a second prediction error signal; second selection means responsive to said first mode signal for selecting from said counting means one prediction error signal with the largest prediction-hit-code number among said first prediction error signals; a first reference code generator including sixth means responsive to said present pel code for providing fourth pel codes near said present pel code, said first reference code generator responsive to said present pel code producing a first reference code; means for providing a second prediction code in response to said first reference code; means for providing a second predection error code in response to said second prediction code and said present pel code; second storing means for storing a third prediction error signal which consists of a plurality of said second prediction error codes delivered from said second prediction error code generating means during said given period; second comparing means for comparing said prediction-hit-code number of said second prediction error signal with said prediction-hit-code number of said third prediction error signal; third selection means for selecting one prediction error signal with larger prediction-hit-code number of said second and third prediction error signals of said first and second storing means in response to said output of said second comparing means and for providing said error signal with larger prediction-hit-code number as a fourth prediction error signal; means for providing in response to said output of said second comparing means a second mode signal indicating that said fourth prediction error signal is either one output of said first or second storing means; and coding means for coding said fourth prediction error signal and said second mode signal, and wherein said receiver comprising; means for decoding the output signal transmitted from said transmitter to reproduce said second mode signal and said fourth prediction error signal; means responsive to said fourth prediction error signal for producing first eligible pel codes given for said present pel code corresponding to said changed distances; fourth selection means responsive to said second mode signal for selecting a second eligible pel code given for said present pel code from said first eligible pel codes; means responsive to the output of said decoding means for producing a third eligible pel code given for said present pel code from said fourth prediction error signal; fifth selection means for selecting said present pel code in response to said second mode signal from said second and third eligible pel codes; a second variable reference code generator for providing second variable reference codes corresponding to said first variable reference codes in response to said present pel code derived from said fifth selection means; means for providing a third prediction codes corresponding to said first prediction codes in response to said second variable reference codes and for supplying said third prediction codes to said first eligible code producing means; a second reference code generator for providing a second reference code corresponding to said first reference code in response to said output of said fifth selection means; and means for providing a fourth prediction code a fourth prediction code corresponding to said second prediction code in response to said second reference code and for supplying said fourth prediction code to said second eligible code producing means.

6. A digital facsimile system adapted to transmit picture signals representative of newspaper pages and the like having a printed character portion and a screened picture portion, said system having a transmitter and a receiver, wherein said transmitter comprising: an input terminal for receiving a digitized facsimile signal in the form of a train of pel codes formed by scanning a picture to be transmitted including black and white pels and digitizing the output of said picture scanning; a first variable reference code generator including first means responsive to the present pel code for providing first pel codes contiguous to said present pel code, second means responsive to said present pel code for providing a second pel code spaced by the pitch of said screened picture, third means responsive to said second pel code for providing third pel codes near said second pel code, and fourth means responsive to said first and second pel codes for changing by given times said pitch distance between said present pel and said second pel codes, said first variable reference code generator responsive to said present pel code producing first variable reference codes corresponding to said changed distances; means responsive to said first variable reference codes for producing first prediction codes corresponding to said changed distances; fifth means for providing first prediction error codes corresponding to said changed distances in response to said first prediction codes and said present pel code; means for counting the prediction-hit-code-numbers of first prediction error signal each of which consists of a plurality of said first prediction error codes during a given period of time; first storing means for storing said first prediction error signals during said given period; first comparing means for comparing said prediction-hit-code-numbers among said first prediction error signals during said given period and for producing a first mode signal indicative of a prediction error signal with the largest prediction-hit-code number among said first prediction error signals; first selection means responsive to said first mode signal for selecting from said first storing means one prediction error signal with said largest prediction-hit-code-number as a second prediction error signal; second selection means responsive to said first mode signal for selecting from said counting means one prediction error signal with the largest prediction-hit-code number among said first prediction error signals; a first prediction state code generator responsive to said first variable reference codes for providing first prediction state codes corresponding to said changed distances; second storing means for storing said first state signals each of which consists of a plurality of said first prediction state codes during said given period; third selection means responsive to said first mode signal for selecting from said second storing means one prediction state signal corresponding to said second prediction error signal as a second prediction state signal; a first reference code generator including sixth means responsive to said present pel code for providing fourth pel codes near said present pel code, said first reference code generator responsive to said present pel code producing a first reference code; means responsive to said first reference code for providing a second prediction code; means responsive to said second prediction code and said present pel code for providing a second prediction error code; third storing means for storing a third prediction error signal which consists of a plurality of said second prediction error codes delivered from said second prediction error code generating means during said given period; a second prediction state code generator for providing a second prediction state code in response to said first reference code; fourth storing means for storing a third prediction state signal which consists of a plurality of said second prediction state codes during said given period; second comparing means for comparing said prediction-hit-code number of said second prediction error signal with said prediction-hit-code number of said third prediction error signal; fourth selection means for selecting one prediction error signal with larger prediction-hit-code number of said second and third prediction error signals of said first and second storing means in response to said output from said second comparing means and for providing said error signal with larger prediction-hit-code number as a fourth prediction error signal; means for providing in response to said output of said second comparing means a second mode signal indicating that said fourth prediction error signal is either one output of said first or second storing means; fifth selection means responsive to said second mode signal for selecting from said second and third prediction state signal and said second mode signal depending on said fourth prediction state signal, and wherein said receiver comprising: means for decoding the output signal transmitted from said transmitter to reproduce said second mode signal and said fourth prediction error signal; means responsive to said fourth prediction error signal for producing first eligible pel codes given for said present pel code corresponding to said changed distances; sixth selection means responsive to said second mode signal for selecting a second eligible pel code given for said present pel code from said first eligible pel codes; means responsive to said fourth prediction error signal for producing a third eligible pel code given for said present pel code; seventh selection means for selecting said present pel code in response to said second mode signal from said second and third eligible pel codes; a second variable reference code generator for providing a second variable reference codes corresponding to said first variable reference codes in response to said present pel code derived from said seventh selection means; means for providing a third prediction codes corresponding to said first prediction codes in response to said second variable reference codes and for supplying said third prediction codes to said first eligible code producing means; a second reference code generator for providing a second reference code corresponding to said first reference code in response to said output of said selection means; and means for providing a fourth prediction code corresponding to said second prediction code in response to said second reference code and for supplying said fourth prediction code to said second eligible code producing means; a third prediction state code generator responsive to said second variable reference codes for providing a fifth prediction state signal corresponding to said first prediction state signals; a fourth prediction state code generator for producing a sixth prediction state signal corresponding to said third prediction state signal in response to said second reference signal; eighth selection means responsive to said second mode signal for selecting one prediction state signal corresponding to said second prediction state signal as a seventh prediction state signal from said fifth prediction state signal; and ninth selection means responsive to said second mode signal for selecting from said sixth and seventh prediction state signals one prediction signal corresponding to said fourth prediction state signal as a eighth prediction state signal and for supplying said eighth prediction state signal and for supplying said eighth prediction state signal to said decoding means.

* * * * *

UNITED STATES PATENT AND TRADEMARK OFFICE
CERTIFICATE OF CORRECTION

PATENT NO. : 4,215,375

DATED : July 29, 1980

INVENTOR(S) : Touru USUBUCHI et al.

It is certified that error appears in the above—identified patent and that said Letters Patent is hereby corrected as shown below:

Column 2, line 16, delete "and" and insert -- end --

Column 5, line 2, delete "$R_\ell$" and insert -- $P_\ell$ -- line 5, delete "$E_o$" and insert -- $E_{\ell o}$ -- line 30, delete "$C_2$" and insert -- $C_\ell$ --

Column 7, line 1, delete "$27_5$ to $27_6$" and insert -- $27_5$ or $27_6$ -- line 3, delete "$27_5$ to" and insert -- $27_5$ or -- line 46, after "one" insert -- of the --

Column 8, line 11, delete "clocck" and insert -- clock --

Column 9, line 3, delete "member" and insert -- memory -- line 33, after "for" insert -- the --

Column 10, line 15, delete "encounters" and insert -- counters -- line 23, after "by" insert -- a --

Column 12, line 22, delete "charging" and insert -- changing -- line 33, after "of" delete "said"

Column 13, line 41, delete "comprising" and insert -- comprises --

UNITED STATES PATENT AND TRADEMARK OFFICE
CERTIFICATE OF CORRECTION

PATENT NO. : 4,215,375

DATED : July 29, 1980

INVENTOR(S) : Touru USUBUCHI et al.

It is certified that error appears in the above—identified patent and that said Letters Patent is hereby corrected as shown below:

Column 14, line 42, delete "comprising" and insert -- comprises -- line 21, delete "dection" and insert -- diction -- line 61, after "providing" delete "a"

Column 15, lines 1-2, delete "a fourth prediction code" (second occurrence).

line 10, delete "comprising" and insert -- comprises --

Column 16, line 28, delete "comprising" and insert -- comprises -- line 43, after "providing" delete "a"

line 47, after "providing" delete "a"

UNITED STATES PATENT AND TRADEMARK OFFICE
CERTIFICATE OF CORRECTION

PATENT NO. : 4,215,375
DATED : July 29, 1980
INVENTOR(S) : Touru USUBUCHI et al.

It is certified that error appears in the above—identified patent and that said Letters Patent is hereby corrected as shown below:

Column 18, lines 2 and 3, delete "and for supplying said eighth prediction state signal" (second occurrence)

Column 3, line 24, delete "$a_4$ to $a_2$" and insert -- $a_2$ to $a_4$ --

Signed and Sealed this

*Tenth* Day of *February 1981*

[SEAL]

*Attest:*

RENE D. TEGTMEYER

*Attesting Officer*  *Acting Commissioner of Patents and Trademarks*